(12) United States Patent
Hoenninger

(10) Patent No.: US 10,252,671 B2
(45) Date of Patent: Apr. 9, 2019

(54) MOTOR VEHICLE HAVING A REAR VIEW DEVICE WITH NO WING MIRRORS

(71) Applicant: Daimler AG, Stuttgart (DE)

(72) Inventor: Anton Hoenninger, Lauda-Koenigshofen (DE)

(73) Assignee: Daimler AG, Stuttgart (DE)

(*) Notice: Subject to any disclaimer, the term of this patent is extended or adjusted under 35 U.S.C. 154(b) by 206 days.

(21) Appl. No.: 15/305,065

(22) PCT Filed: Mar. 28, 2015

(86) PCT No.: PCT/EP2015/000666
§ 371 (c)(1),
(2) Date: Oct. 18, 2016

(87) PCT Pub. No.: WO2015/158416
PCT Pub. Date: Oct. 22, 2015

(65) Prior Publication Data
US 2017/0182943 A1    Jun. 29, 2017

(30) Foreign Application Priority Data
Apr. 19, 2014 (DE) .......... 10 2014 005 803

(51) Int. Cl.
*B60R 1/00* (2006.01)
*B60H 1/24* (2006.01)
(Continued)

(52) U.S. Cl.
CPC .............. *B60R 1/00* (2013.01); *B60H 1/243* (2013.01); *B60Q 9/00* (2013.01); *B60R 11/0217* (2013.01);
(Continued)

(58) Field of Classification Search
None
See application file for complete search history.

(56) References Cited

U.S. PATENT DOCUMENTS 4,439,013 A * 3/1984 Hagn .................. B60R 1/081
359/509
2009/0295181 A1 12/2009 Lawlor et al.
(Continued)

FOREIGN PATENT DOCUMENTS

DE        20010180 U1 *  8/2000  ............... B60R 1/00
DE     200 10 180 U1    10/2000
(Continued)

OTHER PUBLICATIONS

PCT/EP2015/000666, International Search Report dated Aug. 5, 2015 (Two (2) pages).
(Continued)

*Primary Examiner* — James M Anderson, II
(74) *Attorney, Agent, or Firm* — Crowell & Moring LLP

(57) ABSTRACT

A motor vehicle having a rear view device with no wing mirrors is disclosed. The rear view device includes at least one camera, by which at least one part of a rear space/traffic situation can be recorded, and at least one screen, on which the image section recorded by the at least one camera can be displayed. The at least one screen is arranged on a console of a side door protruding towards the vehicle interior, where this console engages at least partially with a recess of the dashboard when the side door is closed.

10 Claims, 2 Drawing Sheets

(51) Int. Cl.
  *B60R 11/02* (2006.01)
  *B60R 11/04* (2006.01)
  *B60Q 9/00* (2006.01)
  *B60R 1/12* (2006.01)
  *B60R 11/00* (2006.01)

(52) U.S. Cl.
  CPC ........ *B60R 11/04* (2013.01); *B60K 2350/106* (2013.01); *B60K 2350/1076* (2013.01); *B60K 2350/2013* (2013.01); *B60K 2350/921* (2013.01); *B60R 2001/1223* (2013.01); *B60R 2001/1261* (2013.01); *B60R 2001/1276* (2013.01); *B60R 2011/0021* (2013.01); *B60R 2300/802* (2013.01); *B60R 2300/8046* (2013.01); *B60R 2300/8053* (2013.01); *B60R 2300/8066* (2013.01)

(56) References Cited

U.S. PATENT DOCUMENTS

2012/0314075 A1  12/2012  Cho
2014/0285666 A1* 9/2014  O'Connell ................ B60R 1/00
                                                  348/148

FOREIGN PATENT DOCUMENTS

| DE | 20 2006 013 620 U1 |   | 1/2007 |
| DE | 10 2007 032 527 A1 |   | 2/2008 |
| DE | 10 2007 054 342 B3 |   | 6/2009 |
| EP | 0 028 370 A1 |   | 5/1981 |
| JP | 55-22228 U |   | 8/1953 |
| JP | 1-112140 U |   | 7/1989 |
| JP | 2-81744 A |   | 3/1990 |
| JP | 5-105038 A |   | 4/1993 |
| JP | 10-166943 A |   | 6/1998 |
| JP | 2010-120595 A |   | 6/2010 |
| JP | 2010202100 A | * | 9/2010 |
| JP | 2013-520363 A |   | 6/2013 |
| WO | WO 2013/067082 A1 |   | 5/2013 |

OTHER PUBLICATIONS

Japanese Office Action issued in Japanese counterpart application No. 2016-563417 dated Oct. 3, 2017 (Five (5) pages).

* cited by examiner

MOTOR VEHICLE HAVING A REAR VIEW DEVICE WITH NO WING MIRRORS

BACKGROUND AND SUMMARY OF THE INVENTION

The present invention relates to a motor vehicle having a rear view device with no wing mirrors which comprises at least one camera, by means of which at least one part of a rear space/traffic situation can be recorded, and at least one screen, on which the image section recorded by the at least one camera can be displayed, wherein the at least one screen is arranged on a console of a side door protruding towards the vehicle interior.

Such a traffic monitoring device in a motor vehicle, having at least one camera mounted on the motor vehicle having a lens which is directed towards the outer side of the motor vehicle, and a monitor arranged in the motor vehicle interior, on which the image information transmitted to the camera from the lens can be displayed, is known from DE 200 10 180 U1.

From DE 10 2007 054 342 B3, a motor vehicle having a rear view device with no wing mirrors is known which has at least one electronic camera system having a viewing angle directed towards the rear of the vehicle which is mounted on the motor vehicle. The lens thereof is thereby arranged on the vehicle body of the motor vehicle in such a way that it protrudes beyond the contour of the vehicle slightly at most and has a screen arranged on the left-hand side of a steering wheel to display the traffic situation in the region to the left behind the vehicle recorded by the camera system, as well as a screen arranged on the right-hand side of a steering wheel to display the traffic situation in the region to the right behind the vehicle recorded by the camera system. Observing the traffic situation towards the rear on both sides of the vehicle should hereby be enabled without the width of the motor vehicle and the air resistance thereof being influenced in a negative manner.

An image processing arrangement for a motor vehicle having at least one camera arranged on the motor vehicle for recording images of the motor vehicle environment, one electronic device coupled to the camera for processing images and at least one image display device coupled to the device to display the images is known from DE 10 2007 032 527 A1. The image display device is thereby arranged on a region of an A-pillar facing the vehicle interior of the motor vehicle, whereby the image display device is arranged in a region which coincides with the field of vision of conventional exterior rear view mirrors.

A disadvantage of prior art is therefore that, if a screen of such a rear view device with no wing mirrors is arranged in the region of an A-pillar, the field of vision of the driver is restricted by the windscreen. However, when arranged in the dashboard, the respective driver must move relative to the previous viewing angle in order to see a wing mirror.

The present invention therefore concerns itself with the problem of specifying an improved or at least one alternative embodiment for a motor vehicle of this type which in particular overcomes the disadvantages known from prior art and also offers further functional advantages.

The present invention is based on the consideration of arranging a screen of a rear view device with no wing mirrors in an installation space of the motor vehicle which, on the one hand, does not restrict the field of vision of the driver and, on the other hand, was not used until now, whereby installation space advantages result. Generally, the motor vehicle according to the invention has the above-mentioned rear view device with no wing mirrors which comprises at least one camera, by means of which at least one part of a rear space can be recorded, and at least one screen, on which the image section recorded by the at least one camera can be displayed. According to the invention, the at least one screen is arranged on a console of a side door protruding towards the vehicle interior, wherein this console engages at least partially with a recess of the dashboard when the side door is closed. This offers the great advantage that the screen can be provided at a position which is ergonomically favorable and arranged at the usual height, the position also not being used until now. The arrangement in this region minimizes a visual occultation towards the exterior in the region of the A-pillar and therefore does not restrict the field of vision of the driver. At the same time, the arrangement of the screen at exactly this position is optimal in terms of visibility and operability, By integrating the screen into a console on the side door, an interference-sensitive video cable is kept extremely short between the camera and the screen and an undisturbed image is thereby guaranteed. This is in particular also favored by the video cable also having no radii and also not coming into contact with other electrical cables, which, for example, can cause EMC interference.

According to the invention, the console has a ventilation duct which is communicatively connected to a ventilation rosette of the dashboard when the side door is closed, and is formed, in particular, for the ventilation of a side window and/or for the cooling of the screen. A console formed in such a way thus considerably enhances the functionality since the screen arranged in this region does not in any way prevent ventilation and, in particular, keeps the side window clear of mist. At the same time, the screen of the rear view device with no wing mirrors can be cooled by the air flow directed through the console by the ventilation rosette, which itself enables the use of temperature-sensitive high-resolution screens which, until now, could not be used for this purpose. The ventilation rosette for the ventilation of the side window, which until now was arranged in the region of the dashboard, can remain substantially unchanged, which itself enables subsequent modification or the simple exchange of the rear mirror for the rear view device with no wing mirrors without corresponding adjustments being required on the dashboard. In order to be able to guarantee a connection which is as flow-tight as possible between the ventilation duct in the console and the ventilation rosette on the dashboard, a seal, in particular a rubber or foam seal, is arranged at the entrance of the ventilation duct which tightly connects the ventilation duct to the ventilation rosette when the side door is closed.

In a preferred embodiment of the solution according to the invention, a loudspeaker, in particular a tweeter, is integrated into the console. The console thus offers not only the possibility to receive the screen and implement a ventilation duct for the ventilation of the side window and/or for the cooling of the screen, but additionally also an installation space for a loudspeaker, in particular a tweeter. The tweeter, which was until now usually arranged in the mirror triangle, can thus be moved easily and arranged in the console, whereby package advantages can be achieved. Further components such as, for example, an antenna, a sensor and/or a hands-free microphone can furthermore be integrated into the console. A particular advantage of this console is therefore also that it can be produced as a prefabricatable assembly and already has all components, such as a ventilation duct, screen, loudspeaker and optional additional components. The cycle time on an assembly line can in particular be reduced by means of such a prefabricatable assembly since, here, the console still only has to be assembled, in particular screwed on, and, for example, correspondingly electrically connected via a plug connection. The actual assembly of the console with the above-mentioned components can, for example, already take place with the supplier or in separate prefabrication.

Expediently, a cantilever is arranged on an outer side of the side door, the cantilever supporting the at least one camera. Such a cantilever can, compared to a previous exterior rear view minor, however, be kept extremely delicate and thereby aerodynamically favorable since, in the favorable case, the camera is only the size of a pin head. By means of the closely adjacent arrangement of the screen on the side door and the at least one camera, the interference-sensitive video cable can in particular be kept short and an undisrupted receiving or undisrupted image can thereby be guaranteed.

Further important features and advantages of the invention result from the sub-claims, the drawings and the corresponding description of the figures by means of the drawings.

It is understood that the features that are named above and are still to be illustrated below are not only able to be used in the respectively specified combination, but also in other combinations or individually, without exceeding the scope of the present invention.

Preferred exemplary embodiments of the invention are depicted in the drawings and illustrated in greater detail in the description below, wherein the same reference numerals refer to the same or similar or functionally identical components.

DETAILED DESCRIPTION OF THE DRAWINGS

Figure 1:
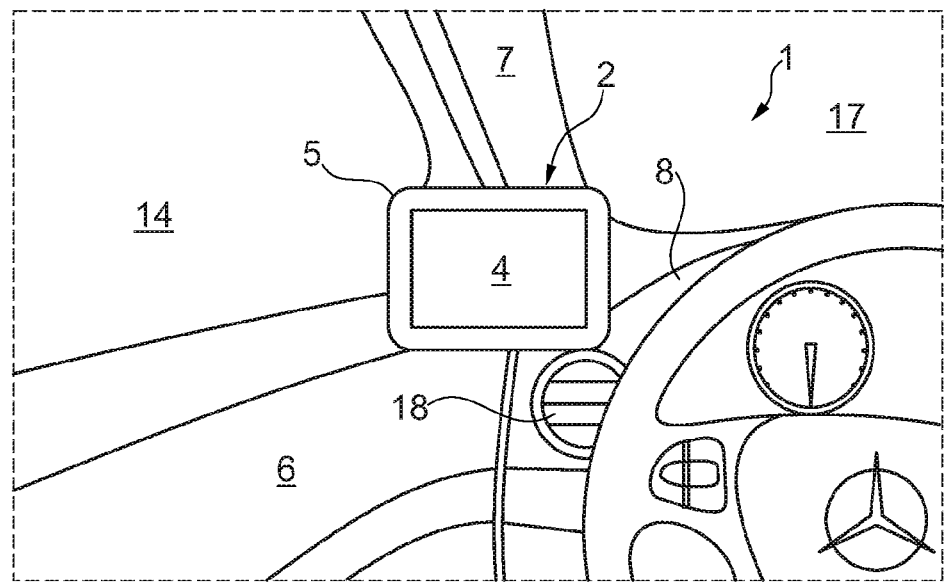
FIG. 1 is an interior view of a motor vehicle according to the invention having a screen which is arranged on a console protruding in the vehicle interior when the side door is closed.
Figure 2:
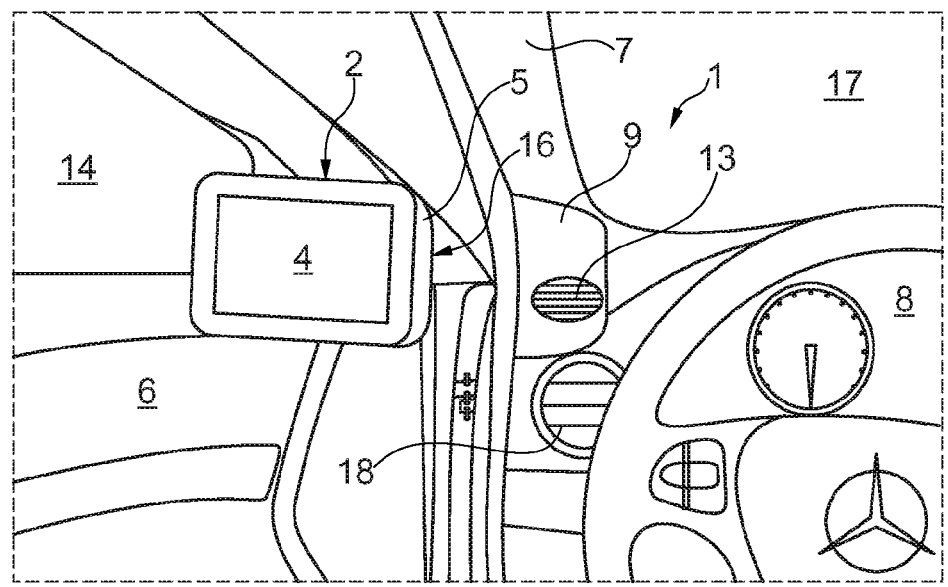
FIG. 2 is a depiction as in FIG. 1, however when the side door is open.
Figure 3:
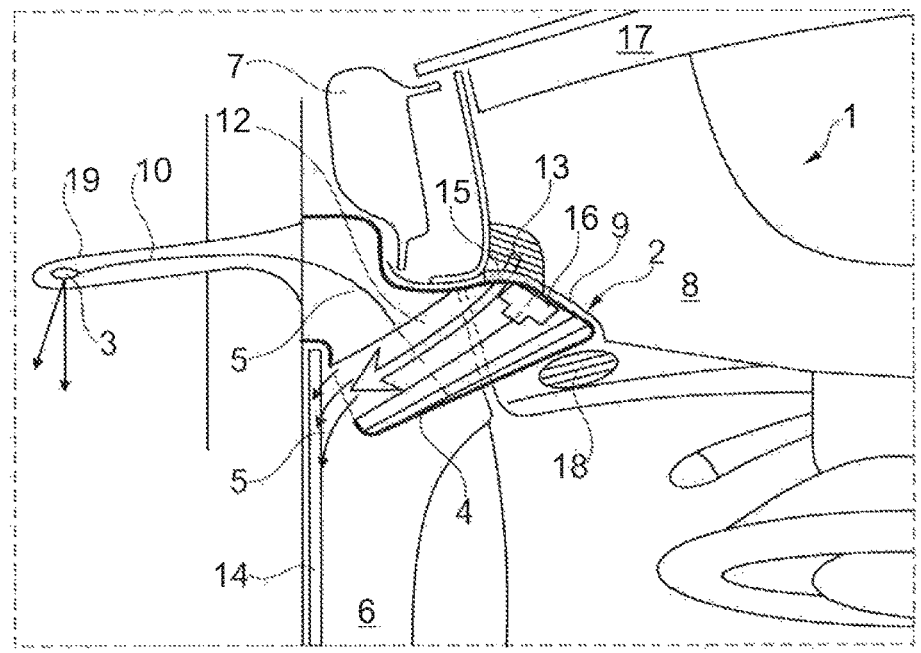
FIG. 3 is a sectional depiction through the motor vehicle in the region of the console.
Figure 4:
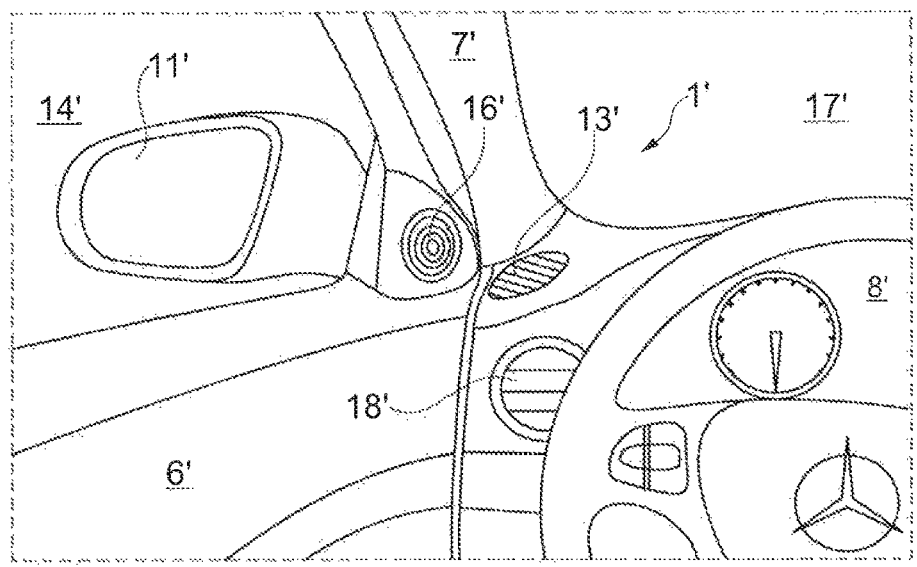
FIG. 4 is a depiction of the vehicle interior without the rear view device with no wing mirrors according to the invention, so according to prior art.

According to FIGS. 1 to 3, a motor vehicle 1 according to the invention has a rear view device 2 with no wing mirrors which has at least one camera 3 (see FIG. 3), by means of which at least one part of a rear space or a rear traffic situation can be recorded, and at least one screen 4, on which the image section recorded by the at least one camera 3 can be displayed. According to the invention, the at least one screen 4 is now on a console 5 on the inner side of a side door which protrudes towards the vehicle interior, wherein this console 5 at least partially engages with a recess 9 (see in particular FIGS. 2 and 3) of the dashboard 8 when the side door 6 is closed. In contrast to the situation which results during the direct connection of the screen to an A-pillar or in the dashboard, as known from prior art, it is possible in the case of arrangement of the screen on the inner side of the side doors according to the invention to arrange the camera 3 and the screen 4 closely adjacent to each other, whereby a video cable 10 which connects these two components 3, 4, can not only be kept short, but also free from radii, which contributes to an undisturbed receiving. The arrangement of the console 5 and the screen 4 in this specific region of the dashboard 8, at the level of the lower end of the A-pillar 7, also represents an optimum solution in terms of visibility and operability, wherein in particular a field of vision of the driver is not restricted or is only slightly restricted. Furthermore, the screen 4 is arranged at almost the same position as an exterior rear view mirror 11' arranged for previous motor vehicles 1' (see FIG. 4), whereby it can be arranged optimally in terms of ergonomics and familiarization of the driver.

When considering FIG. 3, it can be seen that the console 5 has a ventilation duct 12 which is communicatively connected to a ventilation rosette 13 of the dashboard 8 when the side door 6 is closed and is formed in particular for the ventilation of a side window 14 and/or for the cooling of the screen 4. Furthermore, a seal 15, in particular a rubber or foam seal, is arranged at the entrance of the ventilation duct 12, the seal tightly connecting the ventilation duct 12 to the ventilation rosette 13 when the side door 6 is closed. Undesirable bypass flow can hereby be avoided. The ventilation duct 12 thereby runs according to FIG. 3 behind the screen 4 and thus enables a cooling of this.

Furthermore, a loudspeaker 16, in particular a tweeter, can be integrated into the console 5 of the rear view device 2, wherein this loudspeaker 16 is directed, for example, towards the windscreen 17 of the motor vehicle 1 and can thus generate indirect sonication. Furthermore, further additional elements, such as, for example, an antenna, a sensor and/or hands-free microphone, can of course be integrated into the console 5. When the side door 6 is closed, the console 5, and thereby also the screen 4, is arranged above a side ventilation nozzle 18 (see FIGS. 1 and 3) and therefore again positioned in an ergonomically favorable manner and in particular also so as not to restrict the side ventilation function.

When considering FIG. 3, it can be seen that a cantilever 19 is arranged on the outer side of the side door 6, the cantilever supporting the at least one camera 3. This cantilever 19 can, however, be formed to be extremely delicate and thus aerodynamically favorable, since the camera 3, again compared to an exterior rear view mirror 11' (see FIG. 4), can kept small, in particular is only the size of a pinhead.

An ergonomically favorable arrangement of the screen 4 can be enabled by the rear view device 2 according to the invention, the arrangement additionally not restricting or only slightly restricting a field of vision of the driver. By integrating the screen 4 into the console 5 according to the invention as well as providing a corresponding recess 9 on the dashboard 8, the screen 4 can be arranged to be at least partially sunk into the recess 9 when the side door 6 is closed, whereby no installation space restricting the freedom of movement of the driver is used. When the side door 6 is closed, the console 5 is used as a ventilation duct 12 at the same time, whereby undisturbed ventilation of the side window 14 can be guaranteed through the console 5. As a result, however, the ventilation duct 12 not only enables the ventilation of the side window 14 and thereby ensures an ice-free and mist-free property, but it also enables a cooling of the screen 4. Furthermore, the console 5 has further receiving possibilities, for example for a loudspeaker 16 and/or other small components, such as antennas, sensors or microphones, whereby functionality thereof can be enhanced. The formal formation of the console 5 can therefore be adapted to individual vehicle design variants, whereby the rear view device 2 according to the invention can be used in the widest range of vehicle variants. If you look again at FIG. 1, you can see that the screen 4 and the console 5 arranged behind it do not restrict a field of vision in the direction of the windscreen 17 or in the direction of the side window 14, which of course increases the driving safety compared to previous embodiments of such a rear view device 2.

Compared to the exterior rear view mirrors 11' used in previous motor vehicles 1', the field of vision can even be enlarged by the side window 14. In the case of the motor vehicle 1' according to FIG. 4 known from prior art, the components which are identical to the motor vehicle 1 according to FIGS. 1 and 3 according to the invention are referred to with the same reference numerals and apostrophe.

The invention claimed is:

1. A motor vehicle, comprising:
   a rear view device with no wing mirror which includes a camera and which includes a screen, wherein an image section recorded by the camera is displayable on the screen and wherein the screen is disposed on a console of a side door;
   wherein the console is disposed on an inner side of the side door, protrudes towards an interior of the motor vehicle, engages at least partially with a recess of a dashboard when the side door is closed and does not engage with the recess of the dashboard when the side door is open;
   wherein the console has a ventilation duct which is communicatively connected to a ventilation rosette of the dashboard when the side door is closed such that the ventilation duct ventilates a side window and/or cools the screen and wherein the ventilation duct is not communicatively connected to the ventilation rosette of the dashboard when the side door is open.

2. The motor vehicle according to claim 1, further comprising a seal, wherein the seal is disposed at an entrance of the ventilation duct, wherein the seal tightly connects the ventilation duct to the ventilation rosette when the side door is closed, and wherein the seal does not connect the ventilation duct to the ventilation rosette when the side door is open.

3. The motor vehicle according to claim 1, wherein the ventilation duct runs behind the screen.

4. The motor vehicle according to claim 1, further comprising a loudspeaker which is integrated into the console.

5. The motor vehicle according to claim 4, wherein the loudspeaker is directed towards a windscreen.

6. The motor vehicle according to claim 1, wherein a cantilever is disposed on an outer side of the side door and wherein the cantilever supports the camera.

7. The motor vehicle according to claim 1, further comprising at least one component which is disposed in the console.

8. The motor vehicle according to claim 7, wherein the at least one component is an antenna or a sensor.

9. The motor vehicle according to claim 1, wherein, when the side door is closed, the console is disposed above a side ventilation nozzle on the dashboard.

10. The motor vehicle according to claim 4, further comprising a seal, wherein the seal is disposed at an entrance of the ventilation duct and wherein the seal tightly connects the ventilation duct to the ventilation rosette when the side door is closed, and wherein the console, the screen, the ventilation duct, the seal, and the loudspeaker is formed as a prefabricated or prefabricatable assembly.

* * * * *